US012550098B2

United States Patent
Mariyani et al.

(10) Patent No.: US 12,550,098 B2
(45) Date of Patent: Feb. 10, 2026

(54) INITIAL ATTACH PRIORITIZATION METHOD AND SYSTEM

(71) Applicant: T-Mobile Innovations LLC, Overland Park, KS (US)

(72) Inventors: Anil Kumar Mariyani, Ashburn, VA (US); Subramania Kaushik, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 310 days.

(21) Appl. No.: 18/362,427

(22) Filed: Jul. 31, 2023

(65) Prior Publication Data

US 2025/0048303 A1 Feb. 6, 2025

(51) Int. Cl.
*H04W 60/04* (2009.01)
*H04W 12/06* (2021.01)

(52) U.S. Cl.
CPC .......... *H04W 60/04* (2013.01); *H04W 12/06* (2013.01)

(58) Field of Classification Search
CPC ...... H04W 60/04; H04W 12/06; H04W 60/00
See application file for complete search history.

(56) References Cited

U.S. PATENT DOCUMENTS

| 7,801,986 | B2 | 9/2010 | Lybeck et al. | |
| 2012/0051235 | A1* | 3/2012 | Kotecha | H04W 76/50 370/252 |
| 2013/0176958 | A1* | 7/2013 | Xie | H04W 72/56 370/329 |
| 2018/0146503 | A1 | 5/2018 | Castro Castro et al. | |
| 2018/0324585 | A1* | 11/2018 | Nair | H04L 63/0876 |
| 2020/0383042 | A1* | 12/2020 | Lauster | H04W 76/18 |
| 2023/0051733 | A1* | 2/2023 | Shah | H04L 41/0897 |
| 2023/0065199 | A1* | 3/2023 | Khare | H04W 24/02 |
| 2023/0209343 | A1* | 6/2023 | Dudar | H04W 12/068 726/2 |
| 2024/0089887 | A1* | 3/2024 | John | H04W 60/00 |

\* cited by examiner

*Primary Examiner* — Brandon J Miller
(74) *Attorney, Agent, or Firm* — Jones Robb, PLLC (57) ABSTRACT

Systems, methods and devices are provided for subscriber prioritization upon initial attachment. Methods include receiving notification of an initial attach request from a wireless device at a core network component, obtaining a subscriber priority during the initial attach procedure, and sharing the subscriber priority with the network component responding to the initial attach request.

19 Claims, 7 Drawing Sheets

INITIAL ATTACH PRIORITIZATION METHOD AND SYSTEM

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, long term evolution (LTE), etc.), and 5G RATs (new radio (NR)). Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs.

In current wireless implementations, users may operate wireless devices or UEs based on subscriptions. These subscriptions may allow for different priorities. For example, some users, who are wireless priority subscribers (WPS), may be prioritized over other users for wireless services. The prioritized users may, for example, include, first responders, emergency personnel, or law enforcement personnel. Once these users are connected to the network, they are guaranteed priority over other users. However, existing 5G implementations do not have an established method available for prioritizing users upon initial attachment.

Initial attachment occurs when users are new to a network, when users reboot, or when a network outage occurs and users must re-establish their connection with the network. Further, an initial attach procedure may be required in a 5G network when users move from a WiFi network to the 5G NR network, when users move from a 2G, 3G, or an LTE coverage area to the 5G NR network, or when users lose coverage due to being in an area without coverage and move to a 5G NR coverage area.

During network congestion or overload, many wireless device users are unable to perform an initial attach procedure. Further, because there is no prioritization for priority subscribers upon initial attach, the priority users have equal difficulties connecting to the network despite their priority status. Accordingly, a solution is needed for providing prioritization for priority subscribers during initial attach procedures.

OVERVIEW

Exemplary embodiments described herein include systems, methods, computer-readable media, and processing nodes for providing priority to priority subscribers during an initial attach procedure in a 5G network. An exemplary method includes receiving notification of an initial attach request from a wireless device at an authentication server function (AUSF). The method additionally includes obtaining a subscriber priority at the AUSF from a unified data repository (UDR) during an initial attach procedure and sharing the subscriber priority from the AUSF with a network component responding to the initial attach request from the wireless device.

An additional exemplary embodiment includes a system for prioritizing subscribers during an initial attach procedure. The system for prioritizing subscribers during the initial attach procedure includes at least one memory storing instructions and a database, the database storing subscriber information including a subscriber priority. The system further includes a processor executing the instructions to perform multiple operations. The operations include receiving a notification of an initial attach request from a wireless device at an AUSF and obtaining a subscriber priority at the AUSF from a UDR including the database storing subscriber information during the initial attach procedure. The operations additionally include sharing the subscriber priority from the AUSF with a network component responding to the initial attach request from the wireless device.

In yet additional embodiments, a non-transitory computer readable medium is provided for storing instructions executed by a processor to perform multiple operations. The operations include receiving notification of an initial attach request from a wireless device at an AUSF and obtaining a subscriber priority at the AUSF from a UDR during the initial attach procedure. The operations additionally include sharing the subscriber priority from the AUSF with a network component responding to the initial attach request from the wireless device.

An additional exemplary embodiment includes a processing node or network function programmed to perform the methods described herein.

DETAILED DESCRIPTION

Exemplary embodiments described herein include systems, methods, and devices for prioritizing wireless device users during an initial attach procedure in a 5G NR environment. The initial attach procedure occurs when the wireless device initially registers to the network. Embodiments provided herein modify existing network processes and components to support prioritization during initial attachment so that prioritized subscribers are more easily able to access the network during periods of network overloading and congestion.

The evolution of 5G RATs has resulted in significant network architectural developments. For example, the 5G core network offers a serviced based architecture (SBA). The 5G core network is delivered through a set of interconnected network functions (NFs). The NFs are able to access the services of the other NFs in the core network. This is contrast to the 4G LTE evolved packet core, which implemented a fixed-function, hard-wired architecture.

Embodiments described herein operate in conjunction with the network functions of the 5G core network to provide priority to priority subscribers during an initial attach procedure. Prioritization currently only occurs after the initial attach is performed and the priority information is downloaded to an access and mobility function (AMF) and/or session management function (SMF) and/or short message service function (SMSF) from the 5G unified data management (UDM) and 5G unified data repository (UDR).

Thus, during network congestion or overload, many wireless device users are unable to perform an initial attach procedure. The initial attach procedure becomes necessary in multiple instances. For example, an initial attach procedure is necessary when the wireless device user moves out from a WiFi network to the 5G network. The initial attach procedure is also necessary when a wireless device user moves from a 2G/3G/LTE coverage area to the 5G network or from an area of no coverage to a 5G coverage area. Further, the initial attach procedure is also necessary upon a wireless device restart.

In 5G, the authentication server function (AUSF) is used for subscriber concealed identifier (SUCI) de-concealment. The SUCI is a privacy preserving identifier containing the concealed 5G subscription permanent identifier (SUPI). The SUPI is a globally unique identifier that is assigned to each subscriber in the 5G system, which is provisioned in the UDM and the UDR.

Wireless devices generate and transmit the SUCI. The AUSF de-conceals the SUCI containing the SUPI and shares the SUPI and authentication vectors with the AMF. In embodiments disclosed herein, an initial attach prioritization is provided that gives the AUSF the additional capability to include a subscriber priority during the initial attach procedure in response to completion of the end to end vector challenge for authentication of the wireless device. Further, in embodiments disclosed herein, the initial attach prioritization system causes the AUSF to share the subscriber priority with the network component receiving the wireless device request. The network component may, for example, be the AMF. In turn, the AMF leverages the provided priority during network congestion, network overload, or during the initial attach procedure in general by identifying priority users and by setting a high quality of service (QOS) requirement for the priority users.

Thus, during the initial attach procedure, an initial attach prioritization system causes the 5G core network functions to assign and share subscriber priority. The assignment and sharing may be performed in response to completion of the authentication vector challenge to authenticate the wireless device. This process helps the network to prioritize specific WPS such as first responder subscribers during network congestion and severe overload conditions. Thus, an objective of the systems and methods set forth herein is to provide guaranteed service for priority subscribers during the 5G initial attach. Through the use of systems, methods, and devices described herein, existing initial attachment processes are improved with additional functionality enabling recognition and preferred treatment of priority subscribers.

Figure 1:
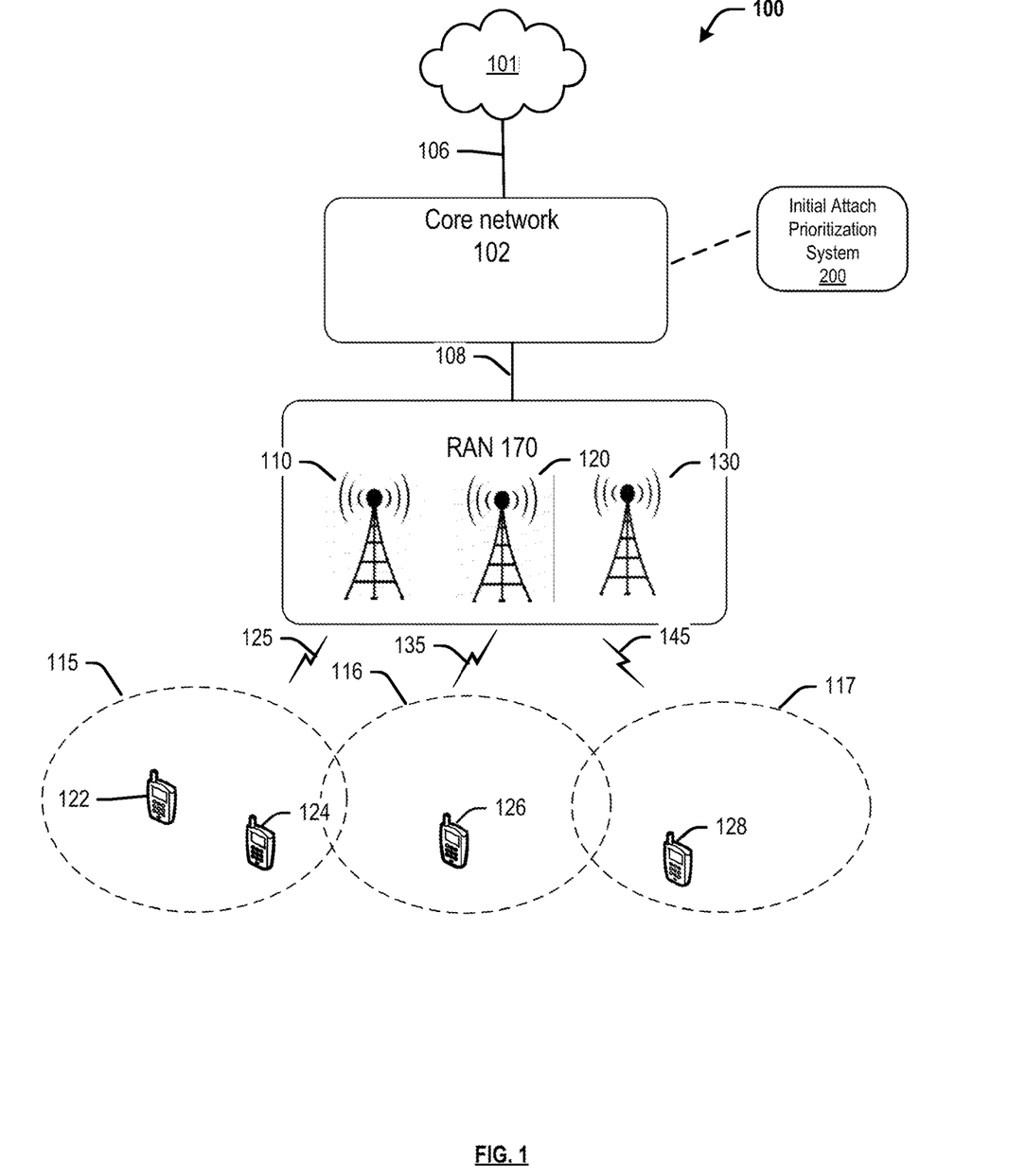
FIG. 1 depicts an exemplary operating environment system for prioritizing wireless devices during an initial attach procedure in accordance with the disclosed embodiments.

FIG. 1 depicts an exemplary system 100 for wireless communication, in accordance with the disclosed embodiments. The system 100 may include a communication network 101, core network 102, and a radio access network (RAN) 170 including access nodes 110, 120, and 130. The RAN 170 may include other devices and additional access nodes. Although three access nodes are shown, any number of access nodes may be included.

The system 100 also includes multiple wireless devices 122, 124, 126, and 128, which may be end-user wireless devices and may operate within one or more coverage areas 115, 116, and 117. The wireless devices 122, 124, 126, 128 communicate with access nodes 110, 120, and/or 130 within the RAN 170 over communication links 125, 135, and 145, which may for example be 5G NR communication links.

The system 100 may further include an initial attach prioritization system 200, which is illustrated as operating at a level of the core network 102. However, it should be noted that the initial attach prioritization system 200 may be an entirely discrete system operating within the core 102 or from outside of the core in a separate processing node.

The initial attach prioritization system 200 operates based on requests for initial attachment from the wireless devices 122, 124, 126, and 128. The initial attach requests may reach the core network 102, which utilizes programming of the initial attach prioritization system 200 for subscriber and priority look-up. Based on the look-up, the initial attach prioritization system 200 transmits a response including a priority of the user to the core network 102.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise Multimedia Broadcast Multicast Services (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. As set forth above, the core network may be a 5G core network using a service based architecture (SBA). The core network 102 may be separated into user plane functions and control plane functions. The user plane accesses a data network, such as network 101, and performs operations such as packet routing and forwarding, packet inspection, policy enforcement for the user plane, quality of service (QOS) handling, etc. The control plane handles radio-specific functionality that depends on the idle or connected states of the wireless devices 122, 124, 126, and 128.

Communication links 106 and 108 can use various communication media, such as air, space, metal, optical fiber, or some other signal propagation path-including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links may use electromagnetic waves in the radio frequency (RF), microwave, infrared (IR), or other wavelength ranges, and may use a suitable communication protocol, including but not limited to Global System for Mobile telecommunications (GSM), Code Division Multiple Access (CDMA), Worldwide Interoperability for Microwave Access (WiMAX), Multimedia Broadcast Multicast Service (MBMS), Single-Carrier Radio Transmission Technology (1×RTT), Universal Mobile Telecommunications System (UMTS), High Speed Packet Access (HSPA), Evolution-Data Optimized (EV-DO), EV-DO rev. A, 3GPP LTE, WiMAX, 4G including LTE Advanced and the like, and 5G including 5G NR or 5G Advanced, 6G, NTN, or combinations thereof.

Communication links 106 and 108 can be direct links or might include various equipment, intermediate components, systems, and networks, such as a cell site router, etc. Communication links 106 and 108 may comprise many different signals sharing the same link.

The RAN 170 may include various access network systems and devices such as access nodes 110, 120, 130. The RAN 170 is disposed between the core network 102 and the end-user wireless devices 122, 124, 126, 128. Components of the RAN 170 may communicate directly with the core network 102 and others may communicate directly with the end user wireless devices 122, 124, 126, 128. The RAN 170 may provide services from the core network 102 to the end-user wireless devices 122, 124, 126, and 128.

The RAN 170 includes multiple access nodes (or base stations) 110, 120, 130, which may include one or more gNodeBs communicating with the plurality of end-user wireless devices 122, 124, 126, 128. It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. The RAN 170 may further comprise a non-terrestrial network (NTN) serving the multiple UEs by a radio frequency transmission provided by utilizing orbiting satellites that may be in communication with access nodes of a terrestrial network (TN). The satellites may include geosynchronous equatorial orbit (GEO) satellites, Medium Earth Orbit (MEO) satellites, and low Earth orbit (LEO) satellites. The NTN may include NTN nodes that are not stationed on the ground.

Access nodes 110, 120, 130 can be, for example, standard access nodes such as a macro-cell access node, a base transceiver station, a radio base station, an, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110, 120, 130 may comprise a short range, low power, small-cell access node such as a microcell access node, a picocell access node, a femtocell access node, or a home eNodeB device. Access nodes 110, 120, 130 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110, 120, 130 can comprise a processor and associated circuitry to execute or direct the execution of computer-readable instructions. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VOIP) phone, a voice over packet (VOP) phone, or a soft phone, a wearable device, an internet of things (IoT) device, as well as other types of devices or systems that can send and receive audio or data. The wireless devices 122, 124, 126 128 may be or include high power wireless devices or standard power wireless devices.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The initial attach prioritization may be implemented as computer-readable instructions or methods, and processing nodes on the network for executing the instructions or methods. The processing node may include a processor included in the access node or a processor included in any controller node in the wireless network that is coupled to the access node.

Figure 2:
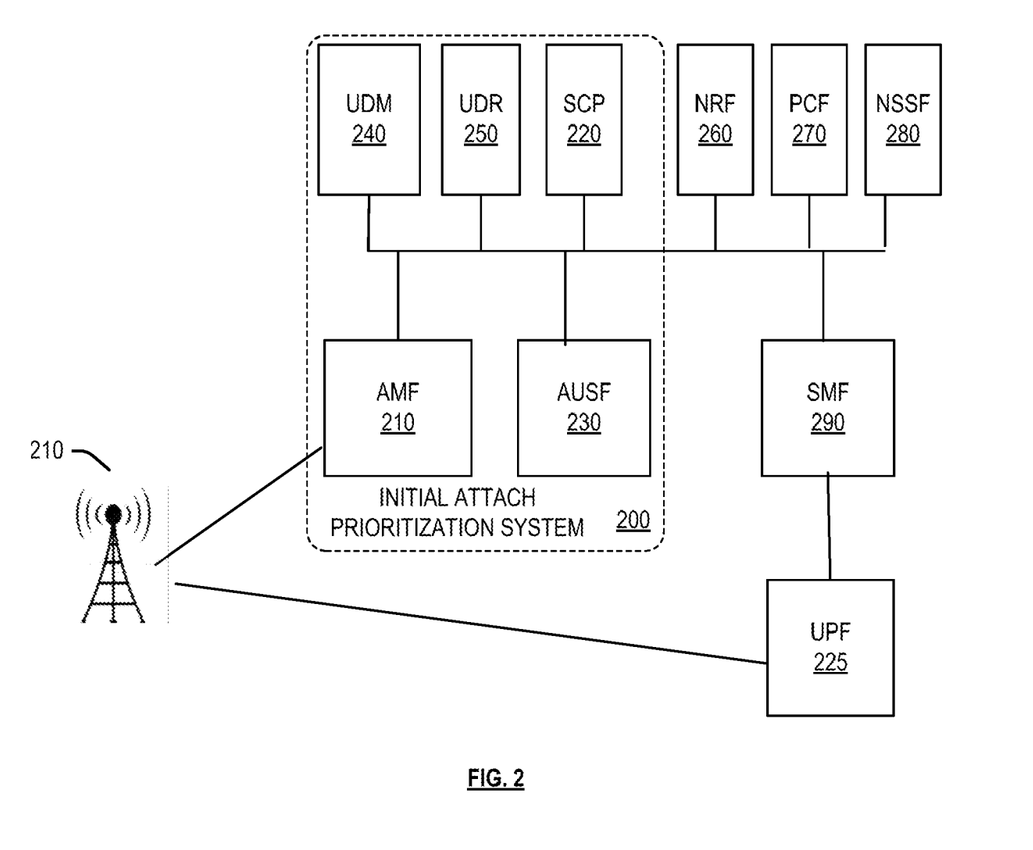
FIG. 2 illustrates an additional exemplary operating environment for an initial attach prioritization system in accordance with disclosed embodiments.

FIG. 2 depicts an exemplary environment for an initial attach prioritization system 200 in accordance with the disclosed embodiments. As explained above, the initial attach prioritization system 200 may be a discrete component or may be incorporated in a core network 102. The environment shown in FIG. 2 illustrates operation of the initial attach prioritization system 200 with reference to components of the core network 102. Components shown in FIG. 2 include control plane functions, such as an access and mobility function (AMF) 210, authentication server function (AUSF) 230, unified data management (UDM) 240, unified data repository (UDR) 250, service communication proxy (SCP) 220, network repository function (NRF) 260, policy control function (PCF) 270, network slice selection function (NSSF) 280, and session management function (SMF) 290. However, the initial attach prioritization system 200 operates on a specific set of components including the AMF 210, AUSF 230, UDM 240, UDR 250, and SCP 220. Additional or fewer control plane functions may also be included.

A user plane function (UPF) 225 performs operations such as packet routing and forwarding, packet inspection, policy enforcement for the user plane, QoS handling, etc. When compared with 4G EPC, the functions of the UPF 225 resemble those of the SGW-U (Serving Gateway User Plane function) and PGW-U (PDN Gateway User Plane function).

When any wireless device 122, 124, 126, 128 sends an initial attach request including a SUCI, a session request is forwarded to the AMF 210, for example from the access node 110. The AMF 210 controls the access of the wireless device to the 5G core network 102. The AMF 210 authenticates the wireless devices 122, 124, 126, 128 and authorizes them to access the 5G network. The AMF 210 knows the location of the wireless device 122, 124, 126, 128, and manages processes related to its mobility. Further, the AMF 210 has the capability to select a suitable UPF 225 for serving each UE 122, 124, 126.

The AMF 210 forwards the initial attach request including the SUCI to the SCP 220. The SCP 220 provides functions ranging from simplifying network topology by applying signaling aggregation and routing, to load balancing, overload handling and message parameter harmonization. The SCP 220 enables dynamic scaling and management of communication and services in the 5G core 102. The SCP 230 has a role which can be compared with its predecessor, the diameter signaling controller (DSC) in 4G. The SCP 220 further can resolve NF discovery requests via communication with the NRF 260. However, in embodiments set forth herein, the SCP 220 functions as a forwarding agent operating between the AMF 210 and the AUSF 230.

In embodiments disclosed herein. The SCP 220 forwards the initial attach or authentication request to the AUSF 230. The AUSF 230 is used to facilitate security processes that can be utilized to ensure priority is provided. The AUSF authenticates wireless devices and stores authentication keys. The AUSF 230 further de-conceals the SUCI, thereby retrieving the SUPI, and formulates the authentication response including the SUPI.

The AUSF 230 interacts with the UDM 240 and the UDR 250. In some embodiments, the AUSF 230 and the UDM 240 may be integrated as a single component. In this instance, an integrated AUSF 230/UDM 240 performs the functions of both components with respect to the connected AMF 210 and UDR 250.

The UDM 240 is a cloud native network function that controls network user data (i.e., the data of subscribers) in a centralized manner. Whereas the AUSF 230 mainly performs authentication processes, the UDM 240 manages the user data for other processes. The UDM interfaces with many other NFs. When the other NFs need subscriber data, they send a request to the UDM 240. The UDM 240 provides user subscription data, such as data used to authenticate wireless devices. Thus, the AUSF 230 communicates with the UDM 240 during authentication. However, the UDM 240 does not necessarily have a database to store subscription information. The UDR 250 stores the subscription information, such as for example, priority information. The UDM 240 communicates with the UDR 250 to obtain subscription information. Although only one UDR 250 is shown, multiple UDRs 250 may store information and the UDRs 250 may be managed by the UDM 240. UE subscription data in the UDM 240 may contain contains a multimedia priority service (MPS) subscription indication (i.e. (MPS) priority) and a mission critical services (MCX) subscription indication (i.e. MCX priority) for the UE that has a subscription to MPS and MCX, respectively. The MPS priority and the MCX priority, if available, are ultimately provided to the AMF 210. Other priority subscriptions are within scope of the disclosure. For example, priority systems may include a range of priorities, ranging for example from a priority 1 to a priority 5, with each of the priorities having an association quality of service (QOS).

In order to initial attach to the wireless network, the UEs or wireless devices 122, 124, 126, 128, send a request over the RAN 170 containing a SUCI in order to authenticate. The requests may be handled by components of the core network 102 described herein. As will be further explained below, in response to the authentication of the wireless device, the request may be evaluated based on a subscriber profile in the UDR 250. The UDR 250 determines a priority available to the requesting subscriber and the UDM 240 and/or the AUSF 230 may respond appropriately to the AMF 210.

In operation, components of the initial attach prioritization system 200 may interact with the illustrated components and may be incorporated in the illustrated components. This interaction will be further described with reference to FIG. 6. Without the initial attach prioritization system 200 described herein, priority subscribers would be detrimentally impacted during initial attach procedures. Accordingly, embodiments provided herein add the initial attach prioritization system 200 to interact with the illustrated components.

The other illustrated core network functions may or may not interact with the initial attach prioritization system 200. The NRF 260 maintains the list of available network functions and their profiles. It also performs services registration and discovery so that different network functions can find each other. The SMF 290 is responsible for establishing modifying, and terminating data sessions. In addition. The SMF 290 selects and controls the UPF 225. The PCF 270 provides access and mobility management related policies for the AMF 210 in order to trigger policy rules. The NSSF 280 provides network slice Information to AMF 210.

Figure 3:
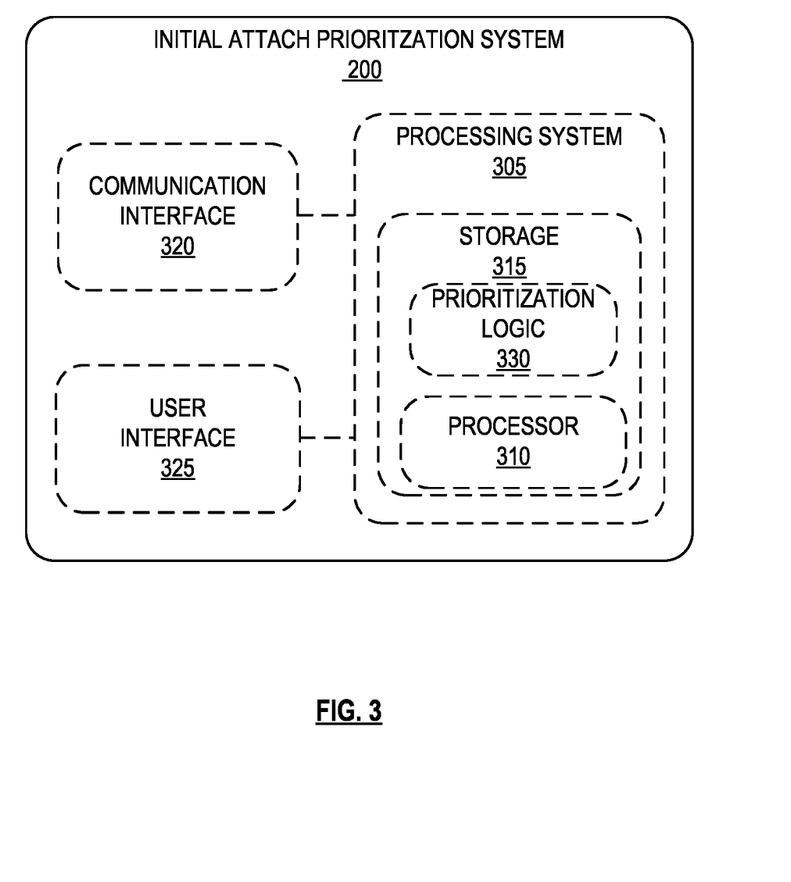
FIG. 3 illustrates an embodiment of an initial attach prioritization system in accordance with disclosed embodiments.

FIG. 3 depicts details of an initial attach prioritization system 200 as a discrete component, which may be configured to perform the methods and operations disclosed herein to facilitate recognition of priority subscribers during initial attachment. In the disclosed embodiments, the initial attach prioritization system 200 may be located within the core network 102 or may be integrated with a separate processing node or with the various displayed components in FIG. 2. Alternatively or additionally, multiple initial attach prioritization systems 200 may be disposed to accommodate wireless devices in different coverage areas 115, 116, 117.

The initial attach prioritization system 200 ensures that users requesting an initial attach procedure are granted priority in accordance with their subscriptions. For example, first responders, emergency personnel, and law enforcement personnel will receive priority in connecting to the network, thus enabling connection during heavy network load or congestion. To perform these functions, the initial attach prioritization system 200 may include a processing system 305 including a storage area 315 and a processor 310. The storage device 315 may store prioritization logic 330. The prioritization logic 330 may include computer readable instructions to assist in distinguishing between priority subscribers and non-priority subscribers and to convey the determination in order to ensure wireless device users are properly prioritized during initial attach procedures.

Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. For example, instructions may be provided to look up wireless device user priorities, attach the priority to a response to an initial attach request, and transmit the response to ensure that priority is properly applied to each wireless user. Processor 310 may be a microprocessor and may include hardware circuitry and/or embedded codes configured to retrieve and execute software stored in storage device 315.

The initial attach prioritization system 200 may include a communication interface 320 and a user interface 325. Communication interface 320 may be configured to enable the processing system 305 to communicate with other components, nodes, or devices in the wireless network. For example, the initial attach prioritization system 200 can provide instructions to the above-described components to ensure that priority is properly applied during initial attach procedures.

Communication interface 320 may include hardware components, such as network communication ports, devices, routers, wires, antenna, transceivers, etc. User interface 325 may be configured to allow a user to provide input to the initial attach prioritization system 200 from other components, such as for example, the AMF 210, SCP 220, AUSF 230, UDM 240, or UDR 250 shown in FIG. 2. User interface 325 may include hardware components, such as touch screens, buttons, displays, speakers, etc. The initial attach prioritization system 200 may further include other components such as a power management unit, a control interface unit, etc.

The initial attach prioritization system 200 thus may utilize the memory 315 and the processor 310 to perform multiple operations. For example, the processor 310 may access stored instructions in the memory 315 to determine priorities and attach the determined priorities to responses in order to ensure proper prioritization of wireless users during an initial attach procedure.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 or the environment 200 may be, comprise, or include computers systems and/or processing nodes, including access nodes, controller nodes, and gateway nodes described herein.

Figure 4:
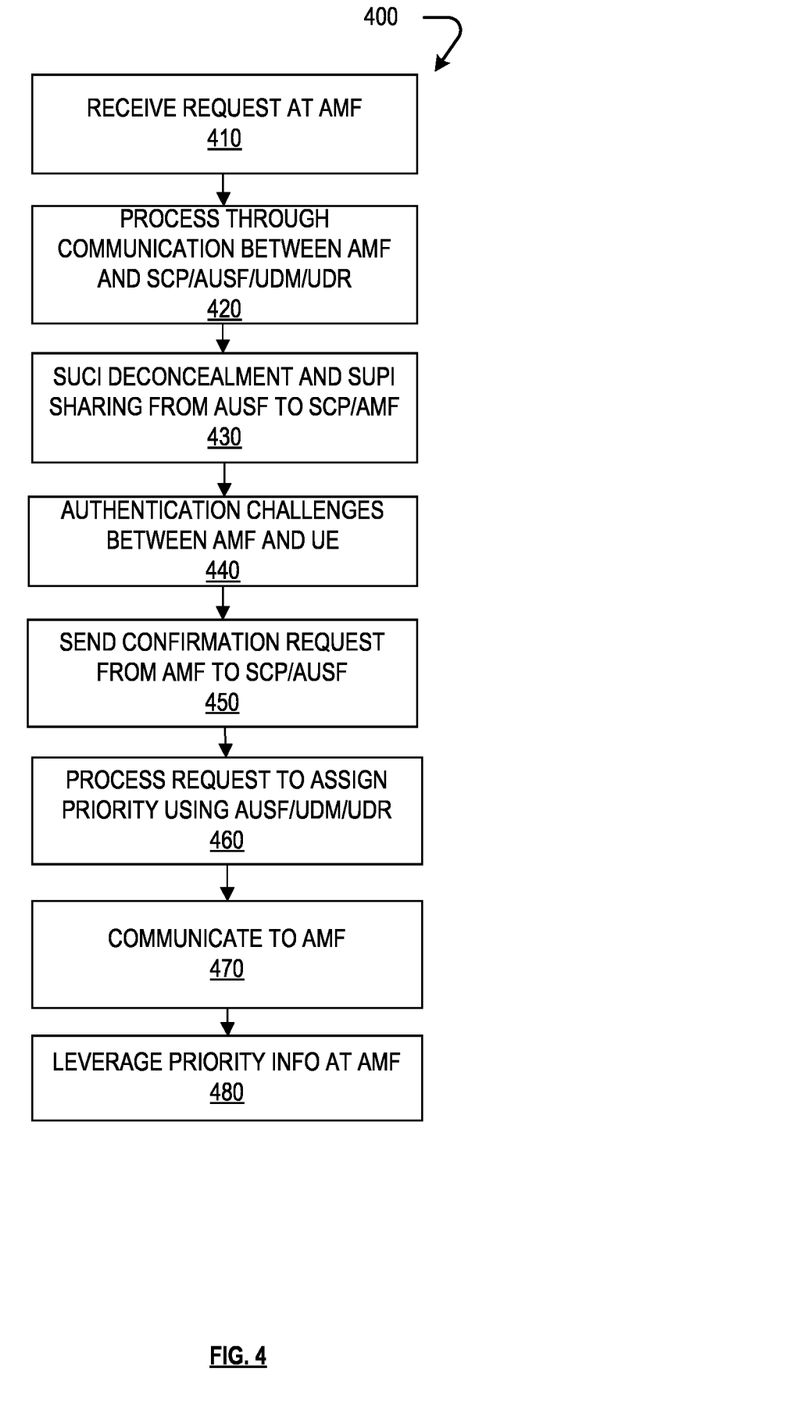
FIG. 4 is a flowchart depicting initial processing of an initial attach request in accordance with disclosed embodiments.

The disclosed methods for initial attach prioritization are discussed further below. FIG. 4 illustrates an exemplary method 400 for processing an initial attach request in accordance with embodiments set forth herein. Method 400 may be performed by any suitable combination of processors discussed herein, for example, a processor contained in an access node 110, 120, 130, processors contained in an AMF 210, SCP 220, AUSF 230, UDM 240, and/or UDR 250, or the processor 310 included in the initial attach prioritization 200 system and/or other processors included in the components and functions shown in FIG. 2.

Method 400 begins in step 410, where an AMF 210 receives an initial attach request from a wireless device 122, 124, 126, 128 through gNB 110, 120, 130. The initial attach request may be embedded in a wireless device message. The message may also include a SUCI containing a SUPI. Other information may also be included in the initial attach request.

In step 420, the initial attach request is processed based on communication between the AMF 210, SCP 220, AUSF 230, UDM 240, and UDR 250. Specifically, the AMF 210 forwards request to the SCP 220, which forwards the request to the AUSF 230. The AUSF 230 communicates with the UDM 240, which accesses subscriber data from the UDR 250. The AUSF 230 receives a response from the UDM 240 and performs SUCI de-concealment and SUPI sharing from the AUSF 230 to the SCP 220 and AMF 210.

In step 440, authentication challenges are performed between the AMF 210 and the wireless devices 122, 124, 126, 128. Upon completion of authentication in step 440, the AMF 210 sends a confirmation request to the SCP 220, which is received by the AUSF 230.

In step 460, the AUSF processes the confirmation request in order to ensure that an appropriate priority is provided to each wireless device 122, 124, 126, and 128. This processing of the confirmation request in step 460 is performed between the AUSF 230, UDM 240, and UDR 250. Through interaction with these components as instructed by the initial attach prioritization system 200, the AUSF 230 determines a priority for the wireless device users in response to authentication of the wireless device. While in some instances the UDM 240 and the AUSF 230 are separate components, in other instances the AUSF 230 and UDM 240 may be combined into a single component. Embodiments of this process for determining priority in response to the authentication are further described below with respect to FIGS. 5A and 5B.

In step 470, the priority is communicated from the AUSF 230, which receives the priority from the UDR 250 and UDM 240, through the SCP 220 to the AMF 210. In step 480, the AMF 210 leverages the provided information in order to treat the wireless devices 122, 124, 126, 128 with an appropriate priority. Thus, while steps 410-450 relate to authentication of a wireless device subscriber during the initial attach procedure, steps 460-480 relate to the provision of priority in response to the authentication.

Figure 5A:
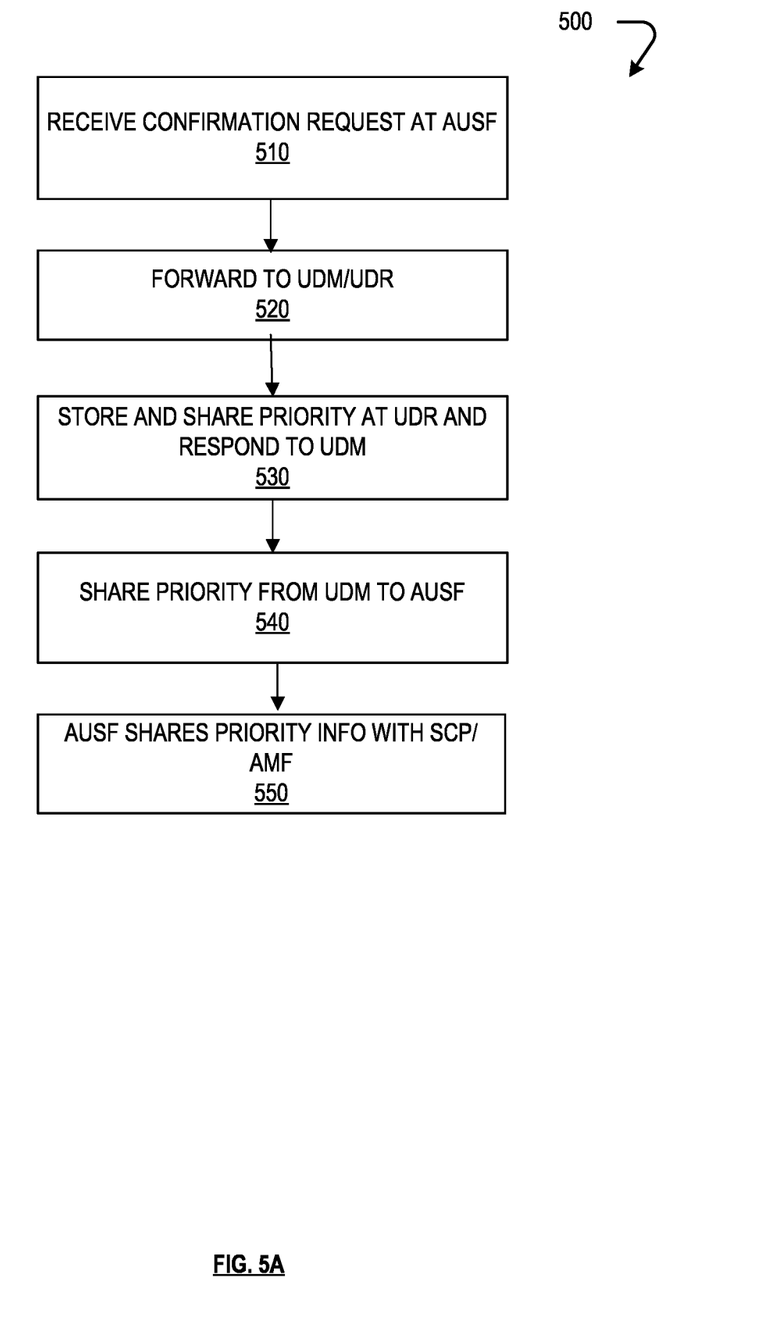
FIG. 5A is a flowchart depicting additional method steps for prioritization during initial attachment in accordance with the disclosed embodiments.

FIG. 5A illustrates further details of the method performed by the initial attach prioritization system 200 in order to determine a priority of a wireless device subscriber in accordance with provided embodiments. The steps of method 500 particularly describe the processing of the initial attach request to assign priority in response to the authentication. The assignment of priority occurs through processing by the by the AUSF 230, UDM 240, and UDR 250 as outlined in step 460 of FIG. 4. Method 500 may further be performed by any suitable processor discussed herein, for example, a processor 310 included in the initial attach prioritization system 200 or a combination of the processor 310 with other processors, such as a processor of the AMF 210, AUSF 230, UDM 240, and UDR 250.

In step 510, the AUSF 230 receives the confirmation request. In step 250, the AUSF forwards the request to the UDM 240, which interacts with the UDR 250. For example, the UDM 240 performs a database lookup of the UDR 250. At step 530, the initial attach prioritization system 200 causes the UDR 250 to store and share the priority for the wireless device 122, 124, 126, 128 and respond to the UDM 240 with the priority. Thus, the UDM 240 receives the stored priority for the wireless device. In step 540 the initial attach prioritization system 200 causes the UDM 240 to share the stored priority with the AUSF 230.

Finally, in step 550, the initial attach prioritization system 200 causes the AUSF 230 to share the priority information for the wireless device through the SCP 220 to the AMF 210. Thus, the AMF 210 is able to leverage the transmitted priority to ensure that the wireless device 122, 124, 126, 128 receives appropriate priority and QoS during the initial attach procedure.

Figure 5B:
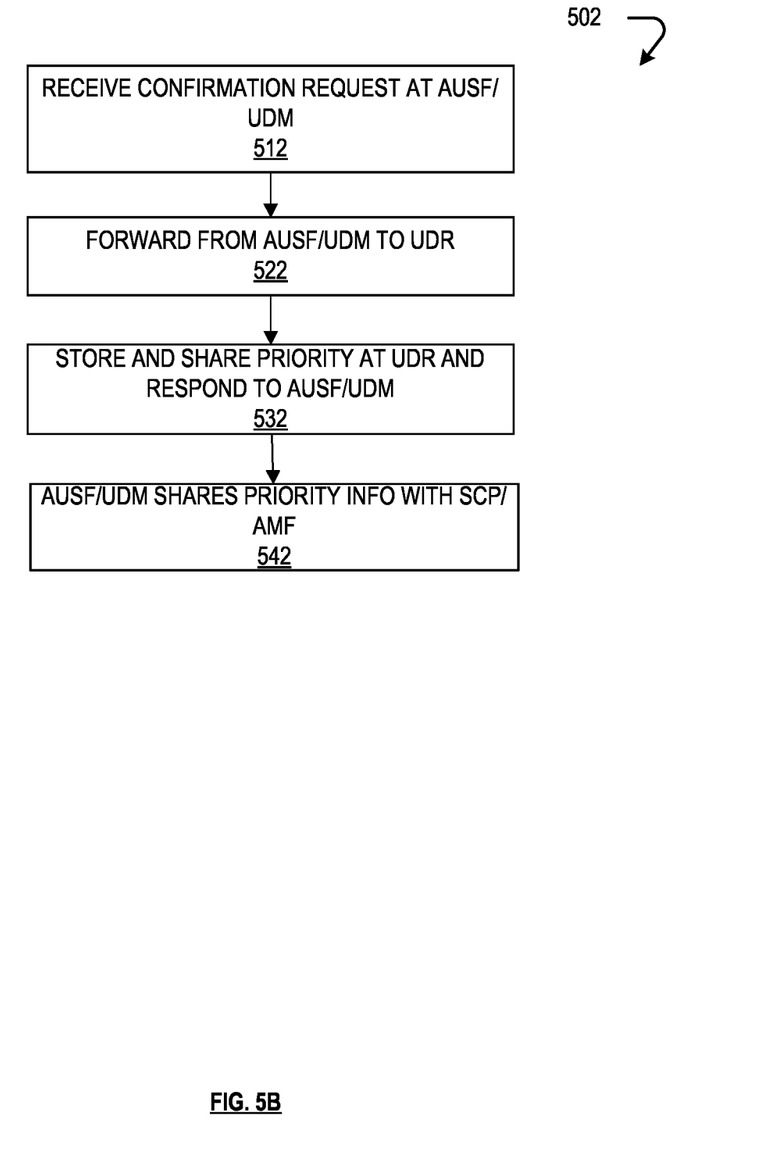
FIG. 5B is a flowchart illustrating additional method steps for completion of prioritization in accordance with further disclosed embodiments.

FIG. 5B illustrates an alternative method 502 performed by the initial attach prioritization system 200 in order to ascertain and assign priority during the initial attach procedure in accordance with disclosed embodiments. Method 502 may be performed by any suitable processor discussed herein, for example, a processor 310 included in the initial attach prioritization system 200 or a combination of the processor 310 with other processors, such as a processor of the AMF 210, AUSF 230, UDM 240, and UDR 250. Method 502 differs from method 500 in that the AUSF 230 and UDM 240 are combined into a single component in the method 502, whereas these components are separate in the method 500. The steps of method 502 particularly describe the processing of the initial attach request by the AUSF 230, UDM 240, and UDR 250 as outlined in step 460 of FIG. 4.

In step 512, the combined AUSF/UDM receives the confirmation request. In step 522, the AUSF/UDM forwards the request to the UDR 250. The UDR 250 stores the priority and response to the AUSF/UDM at step 532. At step 542, the AUSF/UDM shares the priority information with the SCP 220 for transmission to the AMF 210. After these procedures are performed, the initial attach prioritization system 200 causes the AMF 210 to leverage the transmitted priority to ensure that the wireless device 122, 124, 126, 128 receives appropriate priority and QoS during the initial attach procedure. Further, the initial prioritization system 200 may cause the AMF 210 to cache the priority received during the initial attach procedure for future use.

As illustrated in FIGS. 4, 5A, and 5B, methods may be implemented by the initial attach prioritization system 200 in response to an initial attach request to ensure that priority subscribers are able to attach to the network during initial attach procedures. The method is particularly advantageous during periods of high network load and congestion.

Figure 6:
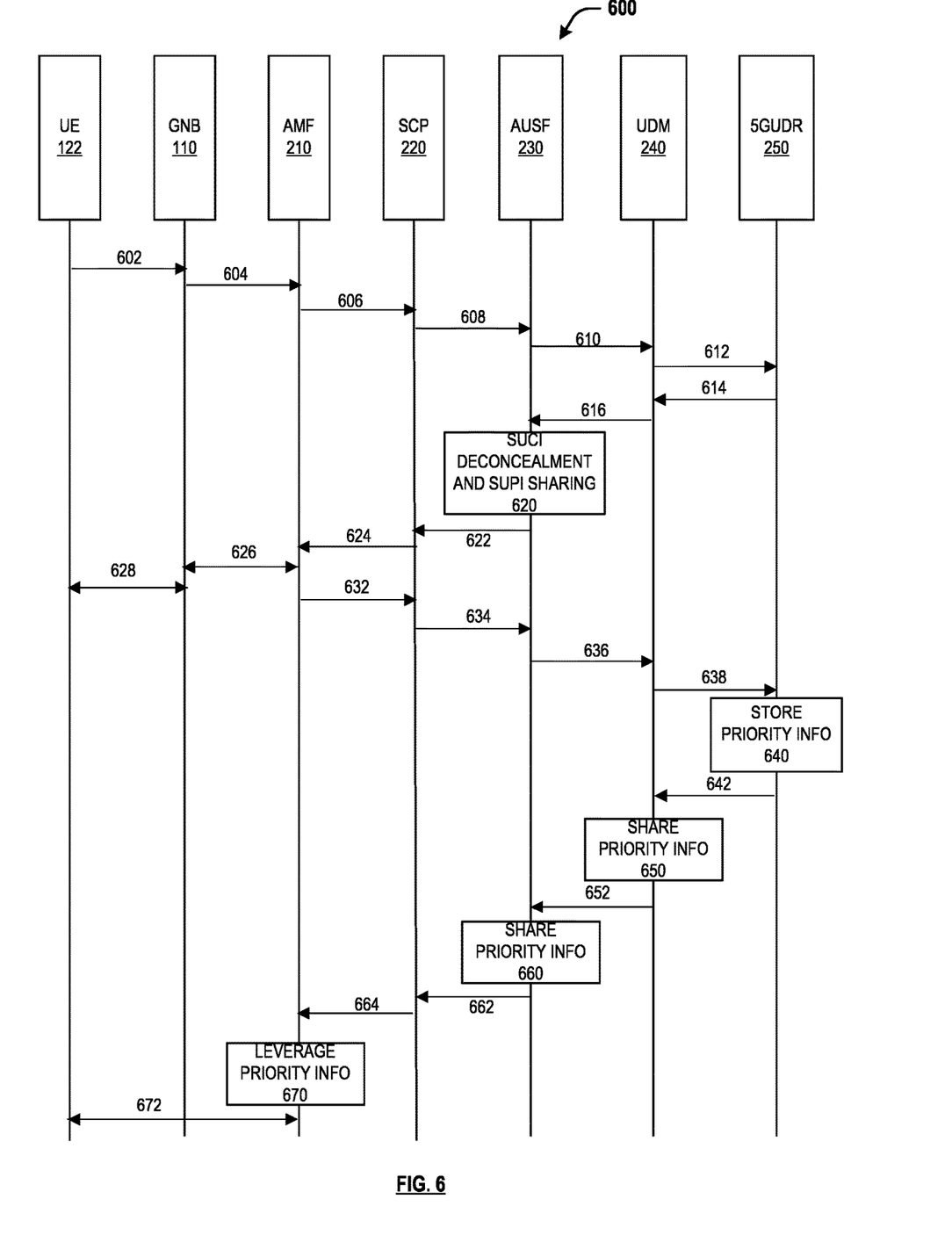
FIG. 6 is a flow diagram depicting an exemplary method for prioritization during initial attachment in accordance with disclosed embodiments.

FIG. 6 illustrates a method 600 for initial attach prioritization showing the interaction between the disclosed network functions, which may be programmed by the initial attach prioritization system 200. In step 602, a UE 122 sends an authentication request or initial attach request to gNB 110. In step 604, the gNB 110 transmits the authentication request to the core network 102, where it reaches the AMF 210. In step 606, the AMF 210 attempts to authenticate the wireless device by sending an authentication authorization request, which reaches the SCP 220. In turn, the SCP 220, in step 608 forwards the authentication authorization request to the AUSF 230.

The AUSF 230 interacts with the UDM 240 in step 610 to request a response from the UDR 250. As described above with respect to FIGS. 5A and 5B, in some embodiments, the AUSF 230 may be combined with the UDM 240 and in this embodiment, step 610 may be omitted. In either case, in step 612, a response is requested from the UDR 250. The UDR 250 sends a response in step 614 to the UDM 240. The UDM 240 forwards the response to the AUSF 230 in step 616. Again, if the AUSF 230 and the UDM 240 are combined as a single function, this step may be omitted as all of this processing occurs within a single combined component.

In step 620, the AUSF 230 performs SUCI de-concealment and determines the SUPI from the SUCI. In embodiments provided herein, the AUSF 230 and the UDM 240 work cooperatively to de-conceal the SUCI in order to ascertain the identity of the wireless device user or subscriber. The AUSF 230 and UDM 240 are able to obtain authentication vectors after ascertaining subscriber identity.

In step 622, the AUSF 230 shares the SUPI and authentication vectors in its response to the SCP 220. In step 624, the SCP 220 acts as a forwarding agent and shares the response including the SUPI and authentication vectors with the AMF 210.

In steps 626 and 628, authentication challenges are completed between the UE 122, gNB 110, and the AMF 210. The response from the UE 122 at step 628 must match what the UDM 240 shared in step 616. After the successful authentication challenges, the AMF 210 forwards a confirmation request to the SCP 220 in step 632. The SCP 220 forwards the confirmation request to the AUSF 230 in step 634.

In steps 636 and 638, the AUSF 230 and UDM 240 perform authentication confirmation. In step 636, the AUSF 230 transmits a request to the UDM 240 and in response, the UDM 240 transmits a request to the UDR 250 in step 638. The UDR 250 stores the transmitted priority information on an ongoing basis in step 640, in response to authentication confirmation, retrieves the priority and transmits a response containing the priority for the wireless device subscriber to the UDM 240 in step 642. The UDM 240 also shares the priority info at 650 and incorporates the priority information in its response to the AUSF 230 in step 652. As explained with respect to FIGS. 5A and 5B, these steps may be consolidated when the AUSF 230 is combined with the UDM 240. Accordingly, in step 650, the UDM 240 shares an additional attribute identifying a priority of the wireless device subscriber to the AUSF 230. For instance, the additional attribute may include priority information identifying a high priority subscriber receiving a specifically designated QoS. This additional attribute is sent in the confirmation message in step 652 to the AUSF 230, and is transmitted to the AMF 210 through the SCP 220

In step 660, the AUSF shares the priority information and sends the shared priority information in an authentication response to the SCP 220 in step 662. The SCP 220 forwards the authentication response including the priority information to the AMF 210 in step 664. At this point, the subscriber priority is confirmed. Thus, the AUSF 230 has the added capability to include a subscriber priority during the confirmation request ("Nausf_Confirmation_Req") after the end to end vectors challenge is completed.

Thus, the AMF 210, has received the subscriber priority from the AUSF 230 and is able to leverage the shared priority in step 670 in order to ensure that wireless devices 122, 124, 126, 128 receive an appropriate quality of service. In particular, the AMF 210 may interact with the wireless device 122 at 672 in a manner appropriate for a high priority device through communication with the gNB 110 and the wireless device 122, thus guaranteeing a high QoS. The AMF 210 may particularly leverage this priority during network congestion, network overload or in general during any scenario by setting high QoS to the priority users like diameter routing message priority (DRMP), service based interface message priority (SMP), etc. As illustrated by the above-described steps, during the initial attach procedure of 5G network functions, the UDM 240, UDR 250, and AUSF 230 can assign the required priority in order to prioritize specific WPS or first responder subscribers as directed by the initial prioritization system 200. This is particularly beneficial during network congestion and severe overload conditions.

In some embodiments, methods 400, 500, 502, and 600 may include additional steps or operations. Furthermore, the methods may include steps shown in each of the other methods. As one of ordinary skill in the art would understand, the methods 400, 500, 502, and 600 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all be within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving notification of an initial attach request from a wireless device at an authentication server function (AUSF), the initial attach request subject to an initial attach procedure;
obtaining a subscriber priority at the AUSF from a unified data repository (UDR) during the initial attach procedure;
assigning the subscriber priority to the wireless device during the initial attach procedure in response to authentication of the wireless device; and
sharing the subscriber priority from the AUSF with a network component responding to the initial attach request from the wireless device.

2. The method of claim 1, further comprising transmitting the notification of the initial attach request from an access and mobility management function (AMF) to a service communication proxy (SCP).

3. The method of claim 2, further comprising sharing the initial attach request from the SCP to the AUSF.

4. The method of claim 2, further comprising performing an authentication challenge to the wireless device from the AMF.

5. The method of claim 4, further comprising completing authentication prior to sharing the subscriber priority from the AUSF.

6. The method of claim 1, wherein the AUSF is combined with a unified data management (UDM) function.

7. The method of claim 1, wherein the AUSF communicates with a unified data management (UDM) function.

8. The method of claim 1, wherein the network component is an access and mobility function (AMF).

9. The method of claim 8, the AMF leverage the shared subscriber priority to provide a QoS to the wireless device during the initial attach procedure.

10. The method of claim 1, further comprising sharing the subscriber priority from the UDR during the initial attach procedure.

11. A system for prioritizing subscribers during an initial attach procedure, the system comprising:
at least one memory storing instructions and a database, the database storing subscriber information including a subscriber priority; and
a processor executing the instructions to perform operations including:
receiving notification of an initial attach request from a wireless device at an authentication server function (AUSF), the initial attach request subject to an initial attach procedure;
obtaining a subscriber priority at the AUSF from the database included in a unified data repository (UDR) during the initial attach procedure;
assigning the subscriber priority to the wireless device during the initial attach procedure in response to authentication of the wireless device; and
sharing the subscriber priority from the AUSF with a network component responding to the initial attach request from the wireless device.

12. The system of claim 11, wherein the network component is an access and mobility management function (AMF).

13. The system of claim 12, the operations further comprising further comprising sharing the subscriber priority from the AUSF upon completing authentication of the wireless device.

14. The system of claim 11, wherein the AUSF is combined with a UDM.

15. The system of claim 11, wherein the AUSF communicates with a UDM.

16. The system of claim 11, the operations further comprising sharing the subscriber priority from the UDR during the initial attach procedure.

17. A non-transitory computer readable medium storing instructions executed by a processor to perform operations comprising:

receiving notification of an initial attach request from a wireless device at an authentication server function (AUSF), the initial attach request subject to an initial attach procedure;

obtaining a subscriber priority at the AUSF from a unified data repository (UDR) during the initial attach procedure;

assigning the subscriber priority to the wireless device during the initial attach procedure in response to authentication of the wireless device; and sharing the subscriber priority from the AUSF with a network component responding to the initial attach request from the wireless device.

18. The non-transitory computer readable medium of claim 16, the operations further comprising receiving confirmation of the authentication of the wireless device from a service communication proxy (SCP).

19. The non-transitory computer readable medium of claim 17, the operations further comprising sharing the subscriber priority with an access and mobility management function (AMF).

\* \* \* \* \*